US011203325B2

(12) United States Patent
Dieudonne

(10) Patent No.: US 11,203,325 B2
(45) Date of Patent: Dec. 21, 2021

(54) SYSTEM AND METHOD FOR IDENTIFYING A DRIVER OF A VEHICLE AFTER THE VEHICLE HAS BEEN STARTED

(71) Applicants: Continental Automotive France, Toulouse (FR); Continental Automotive GmbH, Hannover (DE)

(72) Inventor: Arnaud Dieudonne, Toulouse (FR)

(73) Assignees: Continental Automotive France; Continental Automotive GmbH

(*) Notice: Subject to any disclaimer, the term of this patent is extended or adjusted under 35 U.S.C. 154(b) by 0 days.

(21) Appl. No.: 17/274,518

(22) PCT Filed: Sep. 20, 2019

(86) PCT No.: PCT/EP2019/075336
§ 371 (c)(1),
(2) Date: Mar. 9, 2021

(87) PCT Pub. No.: WO2020/058480
PCT Pub. Date: Mar. 26, 2020

(65) Prior Publication Data
US 2021/0316701 A1    Oct. 14, 2021

(30) Foreign Application Priority Data
Sep. 20, 2018 (FR) ........................... 1858557

(51) Int. Cl.
*B60R 25/10* (2013.01)
*B60R 25/31* (2013.01)
*B60R 16/023* (2006.01)
*G01P 13/00* (2006.01)
*B60R 25/25* (2013.01)
*G07C 5/02* (2006.01)
*B60R 25/23* (2013.01)

(52) U.S. Cl.
CPC .......... *B60R 25/31* (2013.01); *B60R 16/0231* (2013.01); *B60R 25/23* (2013.01);
(Continued)

(58) Field of Classification Search
CPC ....... B60R 25/31; B60R 25/252; B60R 25/23; B60R 16/0231; G01P 13/00; G01P 15/14;
(Continued)

(56) References Cited

U.S. PATENT DOCUMENTS

2011/0304446 A1    12/2011    Basson et al.
2012/0221216 A1    8/2012     Chauncey et al.
(Continued)

FOREIGN PATENT DOCUMENTS

WO    2013133791 A1    9/2013

OTHER PUBLICATIONS

International Search Report and Written Opinion for International Application No. PCT/EP2019/075336, dated Nov. 19, 2019, 7 pages.
(Continued)

*Primary Examiner* — Julie B Lieu
(74) *Attorney, Agent, or Firm* — RatnerPrestia

(57) ABSTRACT

An identification system configured so as to identify a driver of a vehicle after the vehicle has been started, the identification system includes a state detection module configured so as to generate a first dataset containing information relating to at least one movement of a device of the vehicle; an identification module carried or worn by a carrier or wearer and configured so as to generate a second dataset including movement data of the carrier or wearer; and a computing module configured so as to correlate the first dataset with the second dataset so as to determine whether the carrier or wearer and the driver are the same person.

11 Claims, 1 Drawing Sheet

(52) U.S. Cl.
CPC ............ *B60R 25/252* (2013.01); *G01P 13/00* (2013.01); *G07C 5/02* (2013.01)

(58) Field of Classification Search
CPC ............... G01P 6020/206; G07C 5/02; H04M 1/72454; H04M 11/04; H04M 1/724; G08B 13/196; G08B 25/08; G06Q 20/325; G06Q 30/0625; G06Q 30/0267; H04W 4/02; H04W 4/60; H04W 8/22; H04W 4/029; H04W 4/026; H04W 4/027; G06F 3/0346; G06F 16/907
See application file for complete search history.

(56) References Cited

U.S. PATENT DOCUMENTS

| | | | |
|---|---|---|---|
| 2014/0188638 A1* | 7/2014 | Jones | G06Q 20/206 705/16 |
| 2014/0309864 A1* | 10/2014 | Ricci | A61B 5/742 701/36 |
| 2015/0116078 A1 | 4/2015 | Mishra et al. | |
| 2016/0332635 A1* | 11/2016 | Holub | B60W 40/08 |
| 2017/0282856 A1 | 10/2017 | Riedel et al. | |
| 2017/0327079 A1* | 11/2017 | Grossmann | B60R 25/245 |
| 2020/0172050 A1* | 6/2020 | Schwarz | B60R 25/102 |

OTHER PUBLICATIONS

International Search Report and Written Opinion for International Application No. PCT/EP2019/075336, dated Nov. 19, 2019, 12 pages (French).

English Translation of Written Opinion for International Application No. PCT/EP2019/075336, dated Nov. 19, 2019, 4 pages.

* cited by examiner

SYSTEM AND METHOD FOR IDENTIFYING A DRIVER OF A VEHICLE AFTER THE VEHICLE HAS BEEN STARTED

CROSS REFERENCE TO RELATED APPLICATIONS

This application is the U.S. National Phase Application of PCT International Application No. PCT/EP2019/075336, filed Sep. 20, 2019, which claims priority to French Patent Application No. 1858557, filed Sep. 20, 2018, the contents of such applications being incorporated by reference herein.

FIELD OF THE INVENTION

The invention relates in general to a system for identifying the driver of a motor vehicle.

The invention pertains more particularly to a driver identification system configured so as to automatically detect the driver of a vehicle.

BACKGROUND OF THE INVENTION

Modern vehicles are increasingly incorporating electronic devices. An electric vehicle ("EV" in acronym form), a hybrid electric vehicle ("HEV" in acronym form) or a thermal combustion vehicle may thus comprise an electronic control unit ("ECU" in acronym form) coupled to the other devices of the vehicle. The ECU unit is configured so as to analyze orders from a driver and/or data received from the devices of the vehicle, as well as to give instructions to one or more device(s) in question.

This trend in vehicle development also makes provision for applications that use data managed by the ECU of a vehicle. For example, for applications such as vehicle tracking or for safety reasons, it is useful to identify the driver acting on the steering wheel of a vehicle during driving phases.

SUMMARY OF THE INVENTION

However, there is no simple and effective solution for identifying a driver as described above. An aspect of the invention therefore aims to provide a simple solution, using existing devices in a vehicle, for automatically identifying the driver acting on the steering wheel of the vehicle during driving phases.

To achieve this result, an aspect of the present invention relates to an identification system configured so as to identify a driver of a vehicle after the vehicle has been started. The identification system comprises a state detection module configured so as to generate a first dataset containing information relating to at least one movement of a device of the vehicle; an identification module carried or worn by a carrier or wearer and configured so as to generate a second dataset comprising movement data of the carrier or wearer; and a computing module configured so as to correlate the first dataset with the second dataset so as to determine whether the carrier or wearer and the driver are the same person.

An aspect of the invention thus makes it possible to automatically and dynamically identify the driver of the vehicle while avoiding a situation in which a person is still able to drive if this unauthorized person knows the identifier of said vehicle and that of the authorized driver.

Advantageously, the state detection module is configured so as to measure at least one angular position of a steering wheel of the vehicle.

The state detection module is preferably mounted on the vehicle, and comprises a data bus of one of the following types: CAN ("Controller Area Network"), Ethernet, SPI ("Serial Peripheral Interface"), UART ("Asynchronous Receiver Transmitter"), so as to measure the at least one angular position of the steering wheel.

Advantageously, the identification module comprises at least one motion sensor from among the following sensors, in order to generate the movement data of the carrier or wearer:
  an accelerometer configured so as to measure at least one linear movement of the carrier or wearer along one of the three orthogonal axes;
  a gyroscope configured so as to measure at least one angular position of the carrier or wearer;
  a gyrometer configured so as to measure at least one angular velocity of the carrier or wearer.

The second dataset preferably comprises at least one of the following data on the identity of the carrier or wearer:
  an entered pass code input by the carrier or wearer;
  a fingerprint of the carrier or wearer captured by the fingerprint reader.

An aspect of the invention also relates to an identification method for identifying a driver of a vehicle after the vehicle has been started. The method comprises a step of generating a first dataset comprising information relating to at least one movement of a device of the vehicle; a step of generating a second dataset comprising movement data of a carrier or wearer carrying or wearing an identification module; and a correlation step performed between the first dataset and the second dataset so as to determine whether the carrier or wearer and the driver are the same person.

Advantageously, the step of generating the first dataset comprises computing at least one angular position of a steering wheel of the vehicle.

The step of generating the second dataset preferably comprises generating the movement data of the carrier or wearer, comprising at least one of the following steps:
  a step of computing at least one linear movement of the carrier or wearer along one of the three orthogonal axes;
  a step of computing at least one angular position of the carrier or wearer;
  a step of computing at least one angular velocity of the carrier or wearer.

Advantageously, the second dataset comprises at least one of the following data on the identity of the carrier or wearer:
  a pass code input by the carrier or wearer;
  a fingerprint of the carrier or wearer.

The identification method preferably comprises at least one data transmission performed in order to transmit at least part of the first dataset or/and at least part of the second dataset.

BRIEF DESCRIPTION OF THE DRAWINGS

Other features and advantages of aspects of the invention will become apparent from the following description, given with reference to the appended figures which are given by way of non-limiting example.

DETAILED DESCRIPTION OF EMBODIMENTS OF THE INVENTION

Figure 1:
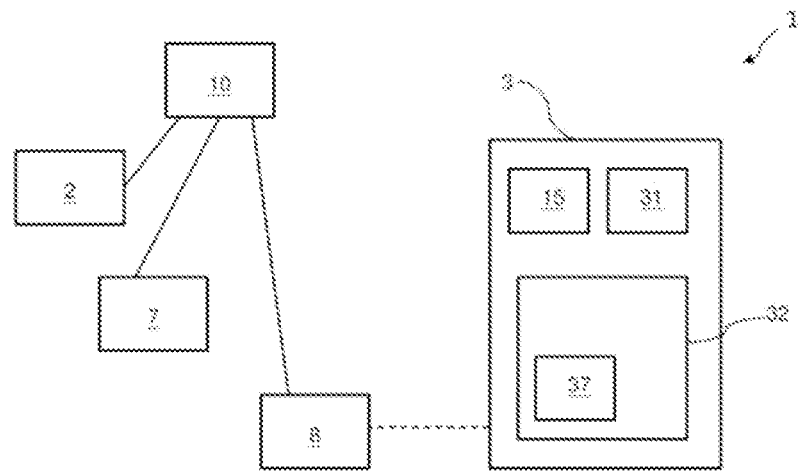
FIG. 1 shows a schematic perspective view of an identification system according to one embodiment of the invention.
Figure 2:
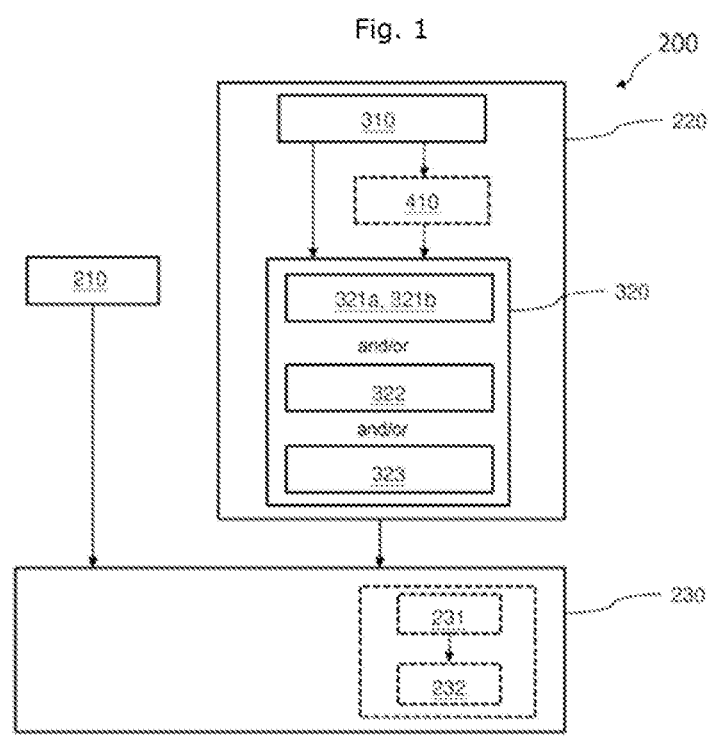
FIG. 2 shows a diagram illustrating an identification method performed by the identification system according to one embodiment of the invention.

FIG. 1 shows a schematic perspective view of an identification system 1 according to one embodiment of the invention. FIG. 2 illustrates an identification method 200 performed by the identification system 1 according to one embodiment of the invention.

The identification system 1 is configured so as to perform the identification method 200 in order, dynamically and automatically and after a vehicle has been started, to identify the driver of the vehicle. The identification method 200 comprises steps 210, 220 and 230 that will be described in detail in the following paragraphs. The identification method 200 according to an aspect of the invention is distinct from a static check performed so as for example to compare an identifier of the driver with that of the vehicle in order to ascertain whether the vehicle belongs to the driver. This static check does not however make it possible to avoid a situation in which a person is still able to drive if this unauthorized person knows the identifier of said vehicle and that of the authorized driver. An aspect of the invention therefore aims to identify, automatically and dynamically, when a vehicle engine is started or during a following driving phase, whether the driver is the right person to drive the vehicle.

To this end, the identification system 1 comprises a state detection module 2, an identification module 3 and a computing module 10. The computing module 10 is configured so as to correlate data generated by the state detection module 2 with those generated by the identification module 3, so as to determine whether a person carrying or wearing the identification module 3 and the driver driving the vehicle are the same person. The functions of the modules 2, 3 and 10 will be described in more detail in the following paragraphs.

The state detection module 2 is configured so as to generate, during an observation time period after the vehicle has been started, a first dataset containing information relating to at least one movement of a device of the vehicle (step 210). During the observation time period, such as a driving phase, devices of the vehicle, for example a steering wheel on which the driver acts, are no longer in rest mode. These devices comprise at least one of the following devices: a steering wheel, a driver's seat, an accelerator and a brake of the vehicle. For example, at least one rotation of the steering wheel takes place when the driver turns the steering wheel. This rotation of the steering wheel reflects a change in state of a device of the vehicle as well as at least one movement of this device.

Thus, according to one preferred embodiment, step 210 is performed by the state detection module 2 by computing at least one angular position of the steering wheel produced by the rotation during an observation time period after startup. That is to say, the first dataset comprises the information relating to the at least one angular position of the steering wheel. Advantageously, the state motion detection module 2 is mounted on the vehicle, and comprises a CAN ("Controller Area Network") data bus, which is a device commonly used and installed in a vehicle. Said at least one angular position of the steering wheel is detected and computed by the CAN data bus.

As an alternative, the CAN data bus contained in the state motion detection module 2 may be replaced with one of the following buses: Ethernet, SPI ("Serial Peripheral Interface"), UART ("Asynchronous Receiver Transmitter").

The generated first dataset may therefore reflect a driving behavior of the driver as well as the state of the vehicle. As an alternative, the first dataset may comprise other information relating to the seat pressure distribution, or to the frequency and/or to a degree of incline of the accelerator and/or of the brake. It is therefore noted that an aspect of the invention is not limited to the movements of a device on which the driver acts, nor to the device used to measure said at least one angular position. Other equivalent devices may be used in other embodiments according to the invention. Therefore, any type of data containing information relating to at least one change in state of a device of the vehicle may constitute the first dataset, without otherwise departing from the scope of an aspect of the present invention.

According to one preferred embodiment, the identification system 1 furthermore comprises a data storage module 7 configured so as to store at least part of the first dataset. A plurality of first datasets relating to one and the same driver, which are generated and stored in the data storage module 7 during a plurality of time periods, may reflect a usual driving behavior of the driver.

The identification module 3 of the identification system 1 is carried or worn by a carrier or wearer and is configured so as to generate a second dataset containing information relating to the carrier or wearer (step 220). As described above, if the carrier or wearer is in their own vehicle during a driving phase, the identification system 1 is able to check and confirm that the carrier or wearer and the driver are the same person.

The identification module 3 preferably comprises a checking module 31 and a motion detection module 32, respectively configured so as to perform steps 310 and 320 (described below). The second dataset generated by the identification module 3 comprises data on the identity of the carrier or wearer and movement data of the carrier or wearer.

The checking module 31 is configured so as, on the basis of the data on the identity of the carrier or wearer that are provided by the carrier or wearer, to check the identity of the carrier or wearer (step 310), so as to determine whether the carrier or wearer is the right person to carry or wear this identification module 3.

To this end, the checking module 31 comprises a human-machine interface ("HMI" in acronym form) allowing the carrier or wearer to provide the identification module 3 with its data on the identity of the carrier or wearer. In one preferred embodiment, the data on the identity of the carrier or wearer comprise a pass code input by the carrier or wearer using the HMI interface.

In one alternative embodiment of step 310, the checking module 31 comprises one or more means intended, preferably in conjunction with the HMI interface, to recognize the carrier or wearer using biometric technologies, such as fingerprint, iris, face or voice recognition. For example, the checking module 31 may comprise a fingerprint reader, and the data on the identity of the carrier or wearer comprise a fingerprint of the carrier or wearer captured by the fingerprint reader.

It should be noted that the HMI interface or the fingerprint reader of the checking module 31 may respectively be a means commonly installed and used in a multifunction mobile telephone ("Smartphone") or a connected bracelet ("Smartphone") carried or worn by the carrier or wearer. An aspect of the invention is therefore not limited to the means used to produce the checking module 31 of the identification module 3. Other similar or equivalent means may be used without otherwise departing from the scope of an aspect of the present invention.

Following step 310, step 320 is performed by the motion detection module 32 so as to generate the movement data of the carrier or wearer, during said observation time period. In one embodiment in which the first dataset comprises angular positions of the steering wheel, the identification module 3 is preferably worn around a wrist of the wearer in order to generate movement data of the wrist of the wearer. It is noted that step 210 of generating the first dataset and step 320 of generating the movement data of the carrier or wearer are preferably performed in the same observation time period after startup.

The motion detection module 32 comprises at least one motion sensor 37 intended to measure at least one movement of the carrier or wearer during said observation time period after the vehicle has been started (step 320), and the at least one motion sensor 37 comprises at least one of the following sensors: an accelerometer, a gyroscope and/or a gyrometer for performing step 320.

The accelerometer is configured so as to measure at least one linear movement of the carrier or wearer along an axis (step 321a). Advantageously, the motion detection module 32 comprises three accelerometers respectively configured so as to measure a linear acceleration of the carrier or wearer along one of the three orthogonal axes (step 321b).

The gyroscope is intended to measure at least one angular position of the carrier or wearer (step 322). The gyrometer is configured so as to measure at least one angular velocity of the carrier or wearer (step 323). Thus, the at least one movement of the carrier or wearer may be detected by measuring a linear movement or/and an angular position or/and an angular velocity.

The movement data of the carrier or wearer that are generated in step 320 may reflect a driving behavior of the carrier or wearer carrying or wearing the identification module 3.

The identification module 3 is preferably installed in a wearable computing device or a multifunction mobile telephone. More advantageously, the wearable computing device is a connected bracelet. In addition, the sensors 37 such as the accelerometer, the gyroscope and the gyrometer that are mentioned above may respectively be a means commonly installed and used in a mobile telephone or a connected bracelet. An aspect of the invention is therefore not limited to the means used to produce the identification module 3. Other similar or equivalent sensors may be used without otherwise departing from the scope of an aspect of the present invention.

According to one preferred embodiment, the identification system 3 furthermore comprises a storage means 15 configured so as to store at least part of the second dataset. A plurality of second datasets relating to one and the same carrier or wearer, which are generated and stored in the storage module 15 during a plurality of observation time periods, may reflect a usual driving behavior of the carrier or wearer.

The storage means 15 may be either installed in the identification module 3, or installed outside the identification module 3 and accessible to the identification module 3.

In one preferred embodiment, the identification system 1 comprises a transmission module 8 configured so as to perform data transmissions between the identification module 3 and the computing module 10. The computing module 10 is coupled to the state detection module 2, to the data storage module 7 and to the transmission module 8. In addition, the identification module 3 furthermore comprises a wireless transmission means intended to communicate with the communication module 8, in order to perform data transmissions between the identification module 3 and the computing module 10.

The computing module 10 may thus perform steps that use data received from the state detection module 2 and/or from the data storage module 7 and/or from the identification module 3.

According to one preferred embodiment, a pre-correlation step 410 is performed after step 310 and before steps 210 and 320, by the computing module 10, so as to check whether the carrier or wearer carrying or wearing the identification module 3 is authorized to drive this vehicle. Advantageously, the data storage module 7 records at least one identifier of an identification module 3 that represents a corresponding carrier or wearer who is authorized to drive this vehicle.

At the end of this optional step 410, if the result shows that the carrier or wearer carrying or wearing the identification module 3 is not authorized to drive the vehicle, the computing module 10 may interrupt the starting of the vehicle and/or send, via the transmission module 8, a warning message to an owner of the vehicle.

Following steps 210 and 220, correlation step 230 is performed by the computing module 10 so as to correlate the first dataset (obtained in step 210) with the second dataset (more precisely, the movement data of the carrier or wearer obtained in step 320, forming part of the second dataset), in order to determine whether the carrier or wearer and the driver are the same person (step 230).

As described above in one embodiment, the first dataset comprises angular positions of the steering wheel, and the second dataset comprises the movement data of the carrier or wearer relating to linear movements or/and angular positions or/and angular velocities relating to the movements of the wrist of the carrier or wearer. These data are obtained during the same observation time period. If the carrier or wearer and the driver are the same person, there is consistency between the first and the second datasets. Preferably, the carrier or wearer (or more precisely, an identifier that represents the identification module 3) is then associated, by the computing module 10, with the driver. Information on this association is preferably recorded in the data storage module 7.

If the carrier or wearer is not the driver actually acting on the steering wheel during the observation time period, this situation is detected by an inconsistency between the first and the second datasets. The computing module 10 is thereby able to determine, during the observation time period, whether the carrier or wearer carrying or wearing the identification module 3 and the driver acting on the steering wheel are the same person.

To improve the correlation between the carrier or wearer and the driver, the computing module 10 may perform a behavior analysis step 231 using first or/and second datasets that are generated and stored during last observation time periods. As mentioned above, the second datasets previously generated and stored corresponding to one and the same carrier or wearer (or more precisely, corresponding to one and the same identifier of the identification module 3) show consistency that reflects the usual driving behavior of said carrier or wearer. Similarly, the first datasets previously generated and stored in the data storage module 7, corresponding to the same driver and being previously associated with the same carrier or wearer (or more precisely, corresponding to the same identifier of the identification module 3), show usual driving behavior of the driver/carrier or wearer.

In one advantageous embodiment, the computing module 10 performs an additional checking step 232 so as to determine, on the basis of data obtained in the behavior analysis step 231 and the second dataset generated during the current observation time period, whether the current carrier or wearer carrying or wearing the identification module 3 is the same person who carried or wore the identification module 3 during the last observation time periods. This additional checking step 232 then makes it possible to avoid a situation in which the current carrier or wearer carrying or wearing the identification module 3 and acting on the steering wheel is not the authorized holder/user of the identification module 3. In this case, the computing module 10 may interrupt the startup or the driving phase and/or send, via the transmission module 8, a warning message to a real holder of the identification module 3 and/or to the owner of the vehicle.

Advantageously, the transmission module 8 is intended to perform the at least one data transmission, preferably in real time, in a wireless communication mode chosen from among a Wi-Fi network and Bluetooth communication. In other words, the transmission module 8 comprises at least one Wi-Fi connection means or/and one Bluetooth connection means. An aspect of the invention is however not limited to the wireless connection means that are used. Other connection means, such as a near-field communication means ("NFC" in acronym form), may be used without otherwise departing from the scope of an aspect of the present invention. In one embodiment in which the data storage module 7 is not coupled electrically to the computing module 10, data transmissions between the computing module 10 and the data storage module 7 may be performed by the transmission module 8.

In addition, according to one embodiment, the computing module 10 is an electronic control unit of the vehicle. Specifically, the state detection module 2, the data storage module 7, the transmission module 8 and the computing module 10 are existing devices in the vehicle. That is to say, the system 1 and the identification method 200 according to an aspect of the invention make it possible to provide an inexpensive solution.

The identification performed by the identification system 1 and the identification method 200 according to an aspect of the invention thus make it possible to automatically and dynamically identify the driver of the vehicle while avoiding a situation in which a person is still able to drive if this unauthorized person knows the identifier of said vehicle and that of the authorized driver. This identification is performed easily, automatically and dynamically when a vehicle engine is started or during a driving phase.

An aspect of the invention furthermore makes it possible to customize the driving configuration on the basis of the drivers of the vehicle. The driving configuration, which is preferably recorded in the data storage module 7, may comprise, but is not limited to, the following functions/parameters:

driving modes and/or habits of the vehicle;
    identification and recording of preferred routes;
    driver confirmation in the context of car sharing;
    multimedia and environmental parameters, such as a brightness level, station parameters, parameters used in the context of the sound system integrated into the driver's seat, for example the telephone connection, telephone calls, voicemail/text messaging/visual messaging, email, etc.

An aspect of the invention is not limited to the embodiments described above but encompasses any embodiment conforming to its spirit.

The invention claimed is:

1. An identification system configured so as to identify a driver of a vehicle after the vehicle has been started, comprising:
    a state detection module configured so as to generate a first dataset containing information relating to at least one movement of a device of the vehicle;
    an identification module carried or worn by a carrier or wearer and configured so as to generate a second dataset comprising movement data of the carrier or wearer; and
    a computing module configured so as to correlate the first dataset with the second dataset so as to determine whether the carrier or wearer and the driver are the same person.

2. The identification system as claimed in claim 1, wherein the state detection module is configured so as to measure at least one angular position of a steering wheel of the vehicle.

3. The identification system as claimed in claim 2, wherein the state detection module is mounted on the vehicle, and comprises a data bus of one of the following types: CAN ("Controller Area Network"), Ethernet, SPI ("Serial Peripheral Interface"), UART ("Asynchronous Receiver Transmitter"), so as to measure the at least one angular position of the steering wheel.

4. The identification system as claimed in claim 1, wherein the identification module comprises at least one motion sensor from among the following sensors, in order to generate the movement data of the carrier or wearer:
    an accelerometer configured so as to measure at least one linear movement of the carrier or wearer along one of the three orthogonal axes;
    a gyroscope configured so as to measure at least one angular position of the carrier or wearer;
    a gyrometer configured so as to measure at least one angular velocity of the carrier or wearer.

5. The identification system as claimed in claim 1, wherein the second dataset comprises at least one of the following data on the identity of the carrier or wearer:
    an entered pass code input by the carrier or wearer;
    a fingerprint of the carrier or wearer captured by the fingerprint reader.

6. An identification method for identifying a driver of a vehicle after the vehicle has been started, comprising:
    a step of generating a first dataset comprising information relating to at least one movement of a device of the vehicle;
    a step of generating a second dataset comprising movement data of a carrier or wearer carrying or wearing an identification module; and
    a correlation step performed between the first dataset and the second dataset so as to determine whether the carrier or wearer and the driver are the same person.

7. The identification method as claimed in claim 6, wherein the step of generating the first dataset comprises computing at least one angular position of a steering wheel of the vehicle.

8. The identification method as claimed in claim 6, wherein the step of generating the second dataset comprises generating the movement data of the carrier or wearer, comprising at least one of:
    of computing at least one linear movement of the carrier or wearer along one of the three orthogonal axes;

of computing at least one angular position of the carrier or wearer;

of computing at least one angular velocity of the carrier or wearer.

9. The identification method as claimed in claim 6, wherein the second dataset comprises at least one of the following data on the identity of the carrier or wearer:

a pass code input by the carrier or wearer;

a fingerprint of the carrier or wearer.

10. The identification method as claimed in claim 6, comprising at least one data transmission performed in order to transmit at least part of the first dataset or/and at least part of the second dataset.

11. The identification method as claimed in claim 7, wherein the step of generating the second dataset comprises generating the movement data of the carrier or wearer, comprising at least one of:

computing at least one linear movement of the carrier or wearer along one of the three orthogonal axes;

computing at least one angular position of the carrier or wearer;

computing at least one angular velocity of the carrier or wearer.

\* \* \* \* \*